(12) United States Patent
Hanner

(10) Patent No.: US 7,171,440 B2
(45) Date of Patent: Jan. 30, 2007

(54) SYSTEM AND METHOD FOR VIRTUAL PACKET REASSEMBLY

(75) Inventor: Brian D. Hanner, Campbell, CA (US)

(73) Assignee: The Boeing Company, Seattle, WA (US)

( * ) Notice: Subject to any disclaimer, the term of this patent is extended or adjusted under 35 U.S.C. 154(b) by 731 days.

(21) Appl. No.: 10/196,512

(22) Filed: Jul. 15, 2002

(65) Prior Publication Data

US 2003/0028666 A1 Feb. 6, 2003

Related U.S. Application Data

(60) Provisional application No. 60/306,155, filed on Jul. 17, 2001, provisional application No. 60/306,188, filed on Jul. 17, 2001, provisional application No. 60/306,193, filed on Jul. 17, 2001.

(51) Int. Cl.
*A06F 15/13* (2006.01)

(52) U.S. Cl. ............................ 709/201; 705/55; 726/25

(58) Field of Classification Search ................. 709/201; 705/55; 726/25
See application file for complete search history.

(56) References Cited

U.S. PATENT DOCUMENTS

| | | | |
|---|---|---|---|
| 6,070,154 A * | 5/2000 | Tavor et al. ................... 705/55 |
| 6,263,444 B1 * | 7/2001 | Fujita ........................... 726/25 |
| 6,266,771 B1 * | 7/2001 | Bellare et al. .............. 713/176 |
| 6,667,978 B1 * | 12/2003 | Delp et al. ................ 370/395.1 |
| 2002/0073138 A1 * | 6/2002 | Gilbert et al. .............. 709/201 |

* cited by examiner

*Primary Examiner*—Viet D. Vu
*Assistant Examiner*—Jinsong Hu
(74) *Attorney, Agent, or Firm*—Alston & Bird LLP

(57) ABSTRACT

A system and method for receiving data packets at a computer system are presented. The method and system comprise receiving at a buffer, at least two data packets. Once received, an ending portion of the first data packet is stored in a buffer, wherein the ending portion comprises at least the last data bit in the first data packet. Next the method and system concatenates the ending portion of the first data packet with a beginning portion of the second data packet so a string search engine can determine if the concatenated data contains a known string of malicious data bits.

30 Claims, 3 Drawing Sheets

SYSTEM AND METHOD FOR VIRTUAL PACKET REASSEMBLY

CLAIM OF PRIORITY

This application claims priority from commonly owned U.S. Provisional Patent Application 60/306,155, titled SYSTEM AND METHOD FOR MULTIDIMENSIONAL DATA COMPRESSION, 60/306,188, titled SYSTEM AND METHOD FOR VIRTUAL PACKET REASSEMBLY and 60/306,193, titled SYSTEM AND METHOD FOR STRING FILTERING all of which were filed on Jul. 17, 2001, are presently pending, and are hereby incorporated by reference in their entirety.

CROSS-RELATED APPLICATIONS

This application is related to utility patent applications U.S. application Ser. No. 10/196,509 titled SYSTEM AND METHOD FOR STRING FILTERING and U.S. application Ser. No. 10/196,488 titled SYSTEM AND METHOD FOR MULTIDIMENSIONAL DATA COMPRESSION, which were filed on the same day as this application and which are hereby incorporated by reference in their entirety.

TECHNICAL FIELD OF THE INVENTION

The present invention relates generally to a system and method for string detection in data-packet reassembly. More particularly, the present invention comprises a system and method for performing real-time virtual data packet reassembly operations in which portions of previously received data packets may be prepended and/or appended to most-recently received data packets to facilitate string filtering across data packet boundaries.

BACKGROUND OF THE INVENTION

The rapid growth and widespread use of the Internet has brought with it an increased threat of hacker attacks on systems and/or networks coupled to the Internet, such as Local Area Networks (LANs). Such attacks may compromise sensitive information and/or destroy data. As a result, a number of companies such as Axent (Rockville, Md.), Internet Security Systems (Atlanta, Ga.), and Network Flight Recorder (Rockville, Md.) have developed Intrusion Detection Systems (IDS). An IDS is designed to analyze all received data for all potential security threats.

A hacker may compromise a LAN by gaining access to and controlling a host computer within the network. This process may involve the issuance of specific instructions to the host computer, which instructions are characterized by particular string of data bits, data sequences, or strings of characters or values.

A typical IDS attempts to detect hacker intrusions by monitoring or scanning all data strings contained in network traffic. A key capability of the typical IDS involves filtering network data packets for the purpose of identifying data packets exhibiting characteristics of known hacker attacks. Filtering typically comprises two tasks. First, identifying specific values in various fields of a protocol header. This is referred to as header filtering. Second, identifying character strings within a payload portion of the data packet. This is referred to as string filtering.

Hackers may communicate with host computers using services such as FTP, SUN Remote Procedure Call, Finger, and others. These services are typically transported over the Internet using TCP/IP protocols. Hackers attempt to exploit certain behaviors of the TCP and IP protocols to hide malicious strings. In particular, a hacker may define TCP/IP packet boundaries such that they bisect malicious strings. As a result, a simple IDS looking at individual data packets fails to recognize a complete string and the attack goes undetected.

To avoid this problem, a typical IDS performs TCP reassembly operations prior to scanning for strings. TCP reassembly operations are directed toward reconstructing an original service message as it appeared before it was divided into data packets for transmission in a specific protocol. A TCP reassembly process extracts service data from each TCP/IP packet, and pieces together the data contained in the payload of each TCP/IP packet to form a seamless data stream.

Packets may, however, arrive out of order, making TCP reassembly operations more difficult. Pointers within a TCP header may be used to re-order the data, but data must be temporarily stored until all of the "holes" in the data are filled. For example, the first of ten packets may arrive last and nine packets must be stored until the first packet hole is filled. This undesirably increases the time interval that an IDS must wait before scanning for strings associated with hacker attacks.

Furthermore, sufficient buffer space must be allocated to the TCP reassembly process to allow for worst-case storage needs. For example, storage of 10 packets with an average length of 1,500 bytes requires a minimum buffer size of 15,000 bytes. Similarly, the total buffer allocation required to support 10,000 simultaneous TCP connections would be 150,000,000 bytes. Buffer allocation places a practical limit on the number of simultaneous TCP connections that can be processed. Consequently, a more efficient method of TCP reassembly is needed to facilitate IDS deployment at high speed Internet access points, where 50,000 or more simultaneous connections are common.

SUMMARY OF THE INVENTION

In one embodiment of the present invention, a system and method for receiving data packets at a computer system comprises receiving at a buffer, at least two data packets. Once received, an ending portion of the first data packet is stored in a buffer, wherein the ending portion comprises at least the last data bit in the first data packet but less than all the data bits in the first data packet. Next the method and system concatenates the ending portion of the first data packet with a beginning portion of the second data packet. A string search engine then determines if the concatenated data contains a known string of malicious data bits.

Another embodiment of the present invention scans packets as they arrive, as well as stores a beginning and an ending portion of each packet. Storing only a small portion of the packet advantageously reduces buffer or storage requirements by a factor of 10 to 50, enabling an IDS to monitor tens of thousands of TCP connections. Scanning packets in such a manner as they arrive comprises a "virtual" reassembly process that may be performed in real-time.

Yet another embodiment of the present invention may attach beginning and ending portions of previously stored data packets to an end or a beginning of an adjacent data packet prior to performing a string search. This enables a string search engine to recognize a complete string when a string spans data packet boundaries, even when data packets are received out of order.

DETAILED DESCRIPTION OF THE INVENTION

The following discussion is presented to enable a person skilled in the art to make and use the invention. The general principles described herein may be applied to embodiments and applications other than those detailed below without departing from the spirit and scope of the present invention. The present invention is not intended to be limited to the embodiments shown, but is to be accorded the widest scope consistent with the principles and features disclosed or suggested herein.

Figure 1:
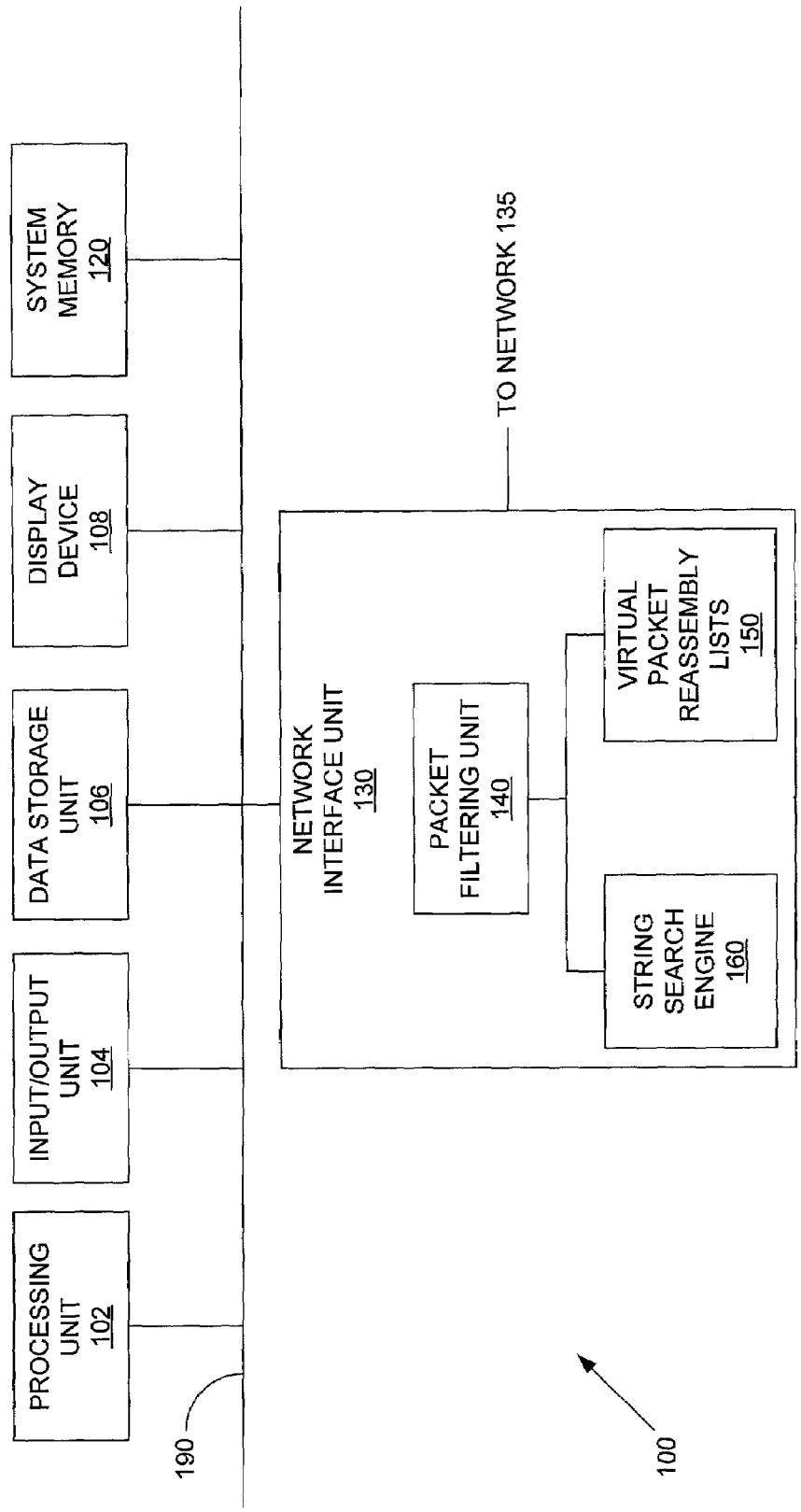
FIG. 1 is a block diagram of system for performing virtual packet reassembly operations in accordance with an embodiment of the invention.

FIG. 1 is a block diagram of a typical system 100 for performing virtual packet reassembly operations in accordance with an embodiment of the invention. The system 100 typically comprises a processing unit 102, an input/output unit 104, a data storage unit 106, a display device 108, a system memory 120, and a network interface unit 130, each of which may be coupled to a common bus 190.

The network interface unit 130 may serve as an interface between the system 100 and a network 135 such as, for example, a LAN or the Internet. The network interface unit 130 may comprise conventional network communication and/or interface elements (not shown), as well as a packet filtering unit 140, a set of virtual-packet reassembly lists 150, and a string search engine 160.

In one embodiment, the packet-filtering unit 140 comprises a state machine, and may be implemented using a Field Programmable Gate Array (FPGA). The packet-filtering unit 140 may also comprise hardware and/or software for performing and/or managing virtual packet reassembly operations in accordance with an embodiment of the invention. The string search engine 160 may also comprise a state machine, which may be implemented in an analogous manner. The virtual-packet reassembly lists 150 may reside within a local memory (not shown) associated with the network interface unit 130.

During a typical communication session, data packets that are to be scanned for known malicious data strings are transmitted from the network 135 in a well known protocol, such as, for example, TCP. The data packets are received at the network interface unit 130 through the packet-filtering unit 140. As the packet-filtering unit 140 receives data packets, it simultaneously performs two tasks. First, the data filtering unit 140 stores portions of received data packets in one or more virtual packet reassembly lists 150. The second task performed by the data-filtering unit 140 is to send each data packet as received to the string search engine 160.

In one embodiment, one virtual-packet reassembly list 150 comprises an ending portion of each data packet received. The ending portion of a data packet comprises at least the last data bit in the data packet but is typically less than all the data bits in the data packet. Some data packets are only a few bits in length, thus in some embodiments, the ending portion happens to also be the entire data packet.

Additionally, a beginning portion of each data packet received is stored in another virtual packet reassembly list 150. Similarly, the beginning portion of a data packet comprises at least the first data bit in the data packet but is typically less than all the data bits in the data packet. Again, in small packets, the beginning portion may be the entire data packet.

Next, stored data, i.e. ending portions and beginning portions, are prepended and/or appended to subsequently received data packets. For example, the ending portion of a first data packet is concatenated with the next data packet in a sequence of data packets. Similarly, the beginning portion of a second data packet is concatenated with the previous data packet in a sequence of data packets. Then, each concatenated string of data is sent to the string search engine 160.

The string search engine 160 determines if a known string of data bits is contained within the data packets. In one embodiment, received data packets are sent to the string search engine 160 as part of a concatenated string after being appended and/or prepended with stored beginning and ending portions of previously received data packets. Thus, known malicious strings that reside in a single received data packet and known malicious strings that reside over the boundary of two consecutive data packets are detected when concatenated strings are sent to the string search engine 160 from the virtual-packet reassembly lists 150.

Another embodiment of the invention performs virtual reassembly of TCP sessions by performing string searches on data packets as they arrive, and storing segment boundary information. For example, an ending portion of a first data packet may be stored until a second data packet arrives. The ending portion may be concatenated with the second data packet such that the string search engine sees a continuous data stream at a data packet boundary. In this fashion, only the ending portion of each data packet is required to be stored and only a single stream of data is passed to the string search engine 160.

Figure 2:
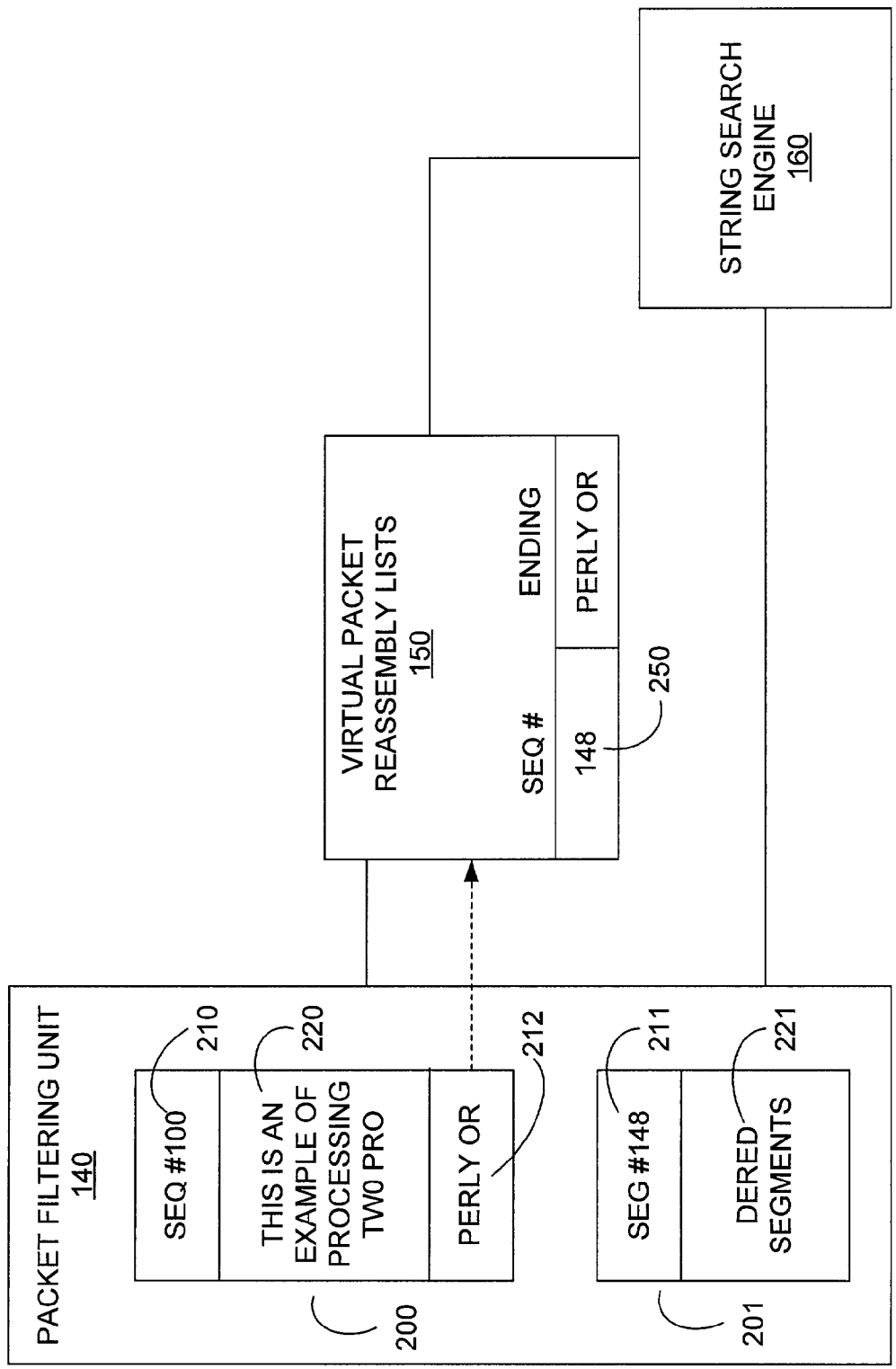
FIG. 2 is an illustration showing a manner in which properly ordered data packets may be processed in accordance with an embodiment of the invention.

FIG. 2 is an illustration of a manner in which properly ordered data packets may be processed in accordance with an embodiment of the invention. In this example, the string "ordered" is considered to be a known malicious data string, thus its detection would be flagged in the string search engine 160. In FIG. 2, a first data packet 200 and a second data packet 201 within a session may be processed by a string search engine 160 that operates, for example, on 8-byte strings. A first sequence number 210 corresponding to the first data packet 200 may comprise an initial sequence number 210 of 100 in the example. The second data packet 201 has a corresponding second sequence number 211 of 148 in this example because the TCP payload 220 of the first data packet 200 includes 48 bytes of data. An ending portion 212 comprising the last 8 bytes of the first data packet 200 is stored in the virtual-packet reassembly list 150 along with a corresponding tagging indication and the computed sequence number 250 (here 148) of a next expected data packet. Here, the string "perly or" would be stored as the ending portion corresponding to the first data packet 200 in the virtual packet reassembly list 150.

Next, the second data packet 201 arrives with sequence number 211 of 148, for which there is an entry (computed sequence number 250) in one of the virtual-packet reassembly lists 150. The associated 8 bytes stored (i.e., "perly or") are concatenated with the TCP payload 221 of the second data packet 201 and the resulting string, "perly ordered segments.", is sent to the string search engine 160. Thus, in the example shown in FIG. 2, the known malicious string "ordered" may be detected by the string search engine 160, even though it straddles two segments.

Figure 3:
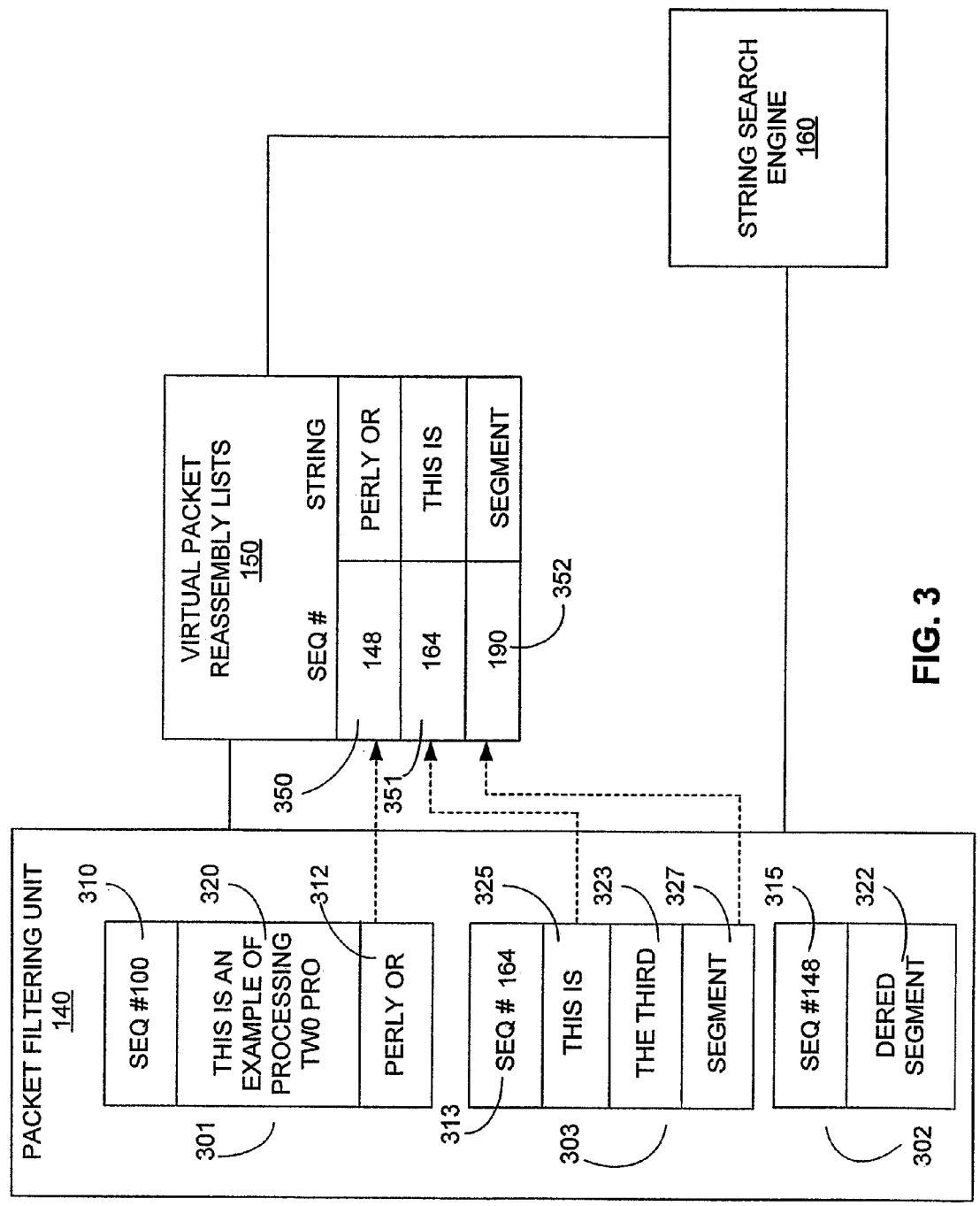
FIG. 3 is an illustration showing a manner in which out of order data packets may be processed in accordance with an embodiment of the invention.

FIG. 3 is an illustration showing a manner in which temporally out of order data packets may be processed in accordance with an embodiment of the invention. In this example, a first data packet 301 and a second data packet 302 within the session contain the same TCP payloads 320 and 322 as in FIG. 2. However, a third data packet 303 arrives out of order; i.e. it arrives before the second data packet 302. The first data packet 301 may be processed as above, and an ending portion 312 of the first data packet 301 is stored in a virtual-packet reassembly list 150 along with a corresponding tagging indication and a computed sequence number 350 of a next expected segment (i.e., 148).

The next data packet (which will later be determined to be the third data packet 303) arrives with sequence number 313 of 164, for which an entry in a virtual packet reassembly list does not yet exist. Thus, a beginning portion 325 of the third data packet 303, a corresponding tagging indication, and the third data packet's sequence number 351 (here 164) are stored in the virtual-packet reassembly list 150. Additionally, an ending portion 327 of the third data packet 303, a corresponding tagging indication, and a computed sequence number 352 (190 in this example) of a next-expected data packet are stored in a virtual-packet reassembly list 150.

A next data packet (later determined to be the second data packet 302) to arrive has sequence number 315 of 148, for which there is an entry in one of the virtual-packet reassembly lists 150. The characters "perly or," forming the ending portion 312 of the first data packet 301 that was stored in a virtual-packet reassembly list 150 in association with a sequence number 350 of 148, are concatenated with the beginning of the TCP payload 322 of this most-recently received data packet, the second data packet 302. A computed next sequence number 313 for the second data packet 302 is 164, for which there is an entry in one of the virtual packet reassembly lists 150. Therefore, the data stored in the virtual-packet reassembly lists 150 in association with the sequence number 351 164 is concatenated with the end of the TCP payload 322 of the most-recently received segment, still the second data packet 302. The concatenated data, which includes prepended data associated with the first data packet 301 (i.e., the first data packet's 301 ending portion 312), the TCP payload 322 of the second data packet 302, and appended data associated with the third data packet 303 (i.e., the third data packet's 303 beginning portion 325), are then sent to the string search engine 160.

In one embodiment, the number of entries in the virtual-packet reassembly lists 150 is equal the number of "holes" in the data-packet stream multiplied by two, plus one. For example, three entries may be created when there is a single hole in the sequence numbers, five entries when there are two holes, and so on. Furthermore, each time a virtual packet reassembly list 150 entry is used it is deleted.

The above embodiments of storing beginning and/or ending portions of data-packet payloads comprise "virtual" TCP reassembly operations because session flows are never totally reconstructed. Rather, boundary conditions between data packets are stored, requiring significantly less memory than conventional TCP reassembly systems and methods.

I claim:

1. A method for detecting a string of data when receiving data packets at a computer:
    (a) receiving at least two different data packets;
    (b) storing in a buffer, an ending portion of the first data packet, the ending portion comprising at least the last data bit in the first data packet but less than all the data bits in the first data packet;
    (c) concatenating the ending portion of the first data packet with the second data packet; and
    (d) determining if the concatenated data includes a known string of data bits.

2. The method of claim 1 further comprising flagging the concatenated data that is determined to include the known string of data bits.

3. The method of claim 1 further comprising searching each received data packet for a known string of data bits.

4. The method of claim 3 further comprising flagging each data packet that includes the known string of data bits.

5. The method of claim 1 wherein the two data packets received are sequential.

6. The method of claim 1 wherein the two data packets received are received out of order.

7. The method of claim 1 further comprising
    (a) storing in the buffer, a beginning portion of the second data packet, the beginning portion comprising at least the first data bit in the second data packet;
    (b) concatenating the ending portion of the first data packet with the beginning portion of the second data packet; and
    (c) determining if the concatenated data includes a known string of data bits.

8. The method of claim 1 further comprising:
    (a) storing in the buffer, an ending portion of the concatenated data, the ending portion comprising at least the last data bit in the concatenated data;
    (b) concatenating the ending portion of the concatenated data with a third data packet; and
    (c) determining if the new concatenated data contains a known string of data bits.

9. The method of claim 8 wherein the third data packet follows the second data packet in a consecutive sequence of data packets.

10. The method of claim 8 wherein the third data packet is received at the buffer before the second data packet.

11. The method of claim 8 wherein at least one additional data packet is received between the second data packet and the third data packet.

12. A method according claim 1 further comprising storing a sequence number of the second data packet in association with the ending portion of the first data packet.

13. A method for detecting a string of data when receiving data packets at a computer:
    (a) receiving at least two different data packets;
    (b) storing in a buffer, a beginning portion of the second data packet, the beginning
    portion comprising at least the first data bit in the second data packet but less than all the data bits in the second data packet;
    (c) concatenating the beginning portion of the second data packet with the first data packet; and
    (d) determining if the concatenated data includes a known string of data bits.

14. The method of claim 13 wherein the second data packet follows the first data packet in a consecutive sequence of data packets.

15. The method of claim 13 wherein the second data packet is received at the buffer before the first data packet.

16. The method of claim 13 wherein at least one additional data packet is received between the first data packet and the second data packet.

17. The method of claim 13 further comprising:
(a) determining that the known string of data bits is not found in the concatenated data;
(b) storing in the buffer, a beginning portion of the concatenated data, the beginning portion comprising at least the last data bit in the concatenated data;
(c) concatenating the beginning portion of the concatenated data with a third data packet; and
(d) determining if the new concatenated data contains a known string of data bits.

18. The method of claim 17 wherein the third data packet follows the second data packet in a consecutive sequence of data packets.

19. The method of claim 17 wherein the third data packet is received at the buffer before the second data packet.

20. The method of claim 17 wherein at least one additional data packet is received between the second data packet and the third data packet.

21. A method according claim 13 further comprising storing a sequence number of the second data packet in association with the beginning portion of the second data packet.

22. A method for detecting a string of data when receiving data packets at a computer:
(a) receiving at least three different data packets;
(b) storing in a buffer, an ending portion of the first data packet, the ending portion comprising at least the last data bit in the first data packet;
(c) storing in the buffer, a beginning portion of the third data packet, the beginning portion comprising at least the first data bit in the third data packet, wherein at least one of the ending portion of the first data packet and the beginning portion of the third data packet comprises less than all the data bits of the respective data packet;
(d) concatenating the ending portion of the first data packet and the beginning portion of the third data packet with a second data packet; and
(e) determining if the concatenated data includes a known string of data bits.

23. A method according claim 22 further comprising:
storing a sequence number of the third data packet in association with the ending portion of the first data packet; and
storing a sequence number of the third data packet in association with the beginning portion of the third data packet.

24. A system for detecting a string of data when receiving data packets at a computer, the system comprising:
(a) a memory, coupled to a packet filtering unit, operable to store data included the data packets and to store virtual-packet reassembly lists;
(b) a string search engine coupled to the packet filtering unit operable to detect a string of data; and
(c) a packet filtering unit coupled to the memory and operably scanning data packets for known strings of data bits, the packet filtering operable to:
receive at least two different data packets;
(d) (ii) store, in a buffer, an ending portion of the first data packet, the ending portion comprising at least the last data bit in the first data packet and a beginning portion of the second data packet, the beginning portion comprising at least the first data bit in the second data packet, wherein at least one of the ending portion of the first data packet and the beginning portion of the third data packet comprises less than all the data bits of the respective data packet;
(e) (iii) concatenate the ending portion of the first data packet with the beginning portion of the second data packet; and
(f) (iv) determine if the concatenated data includes a known string of data bits.

25. The system of claim 24 wherein the packet filtering unit is further operable to determine if each data packet includes a known string of data bits.

26. A system according claim 24 wherein the packet filtering unit is further operable:
to store a sequence number of the second data packet in association with the ending portion of the first data packet; and
to store a sequence number of the second data packet in association with the beginning portion of the second data packet.

27. A system for detecting a string of data when receiving data packets at a computer, the system comprising:
(a) a memory, coupled to a packet filtering unit, operable to store data included the data packets and to store virtual-packet reassembly lists;
(b) a string search engine coupled to the packet filtering unit operable to detect a string of data; and
(c) a packet filtering unit coupled to the memory and operably scanning data packets for known strings of data bits, the packet filtering operable to:
receive at least two different data packets;
(d) (ii) store in a buffer an ending portion of the first data packet, the ending portion comprising at least the last data bit in the first data packet but less than all the data bits in the first data packet;
(e) (iii) concatenate the ending portion of the first data packet with the second data packet; and
(f) (iv) determine if the concatenated data includes a known string of data bits.

28. The system of claim 27 wherein the packet filtering unit is further operable to:
(a) store in the buffer an ending portion of the concatenated data, the ending portion comprising at least the last data bit in the concatenated data;
(b) concatenate the ending portion of the concatenated data with the beginning of a third data packet; and
(c) determine if the new concatenated data includes a known string of data bits.

29. The system of claim 28 wherein the packet filtering unit is further operable to determine if each data packet includes a known string of data bits.

30. A system according claim 27 wherein the packet filtering unit is further operable to store a sequence number of the second data packet in association with the ending portion of the first data packet.

* * * * *